Patented June 2, 1931

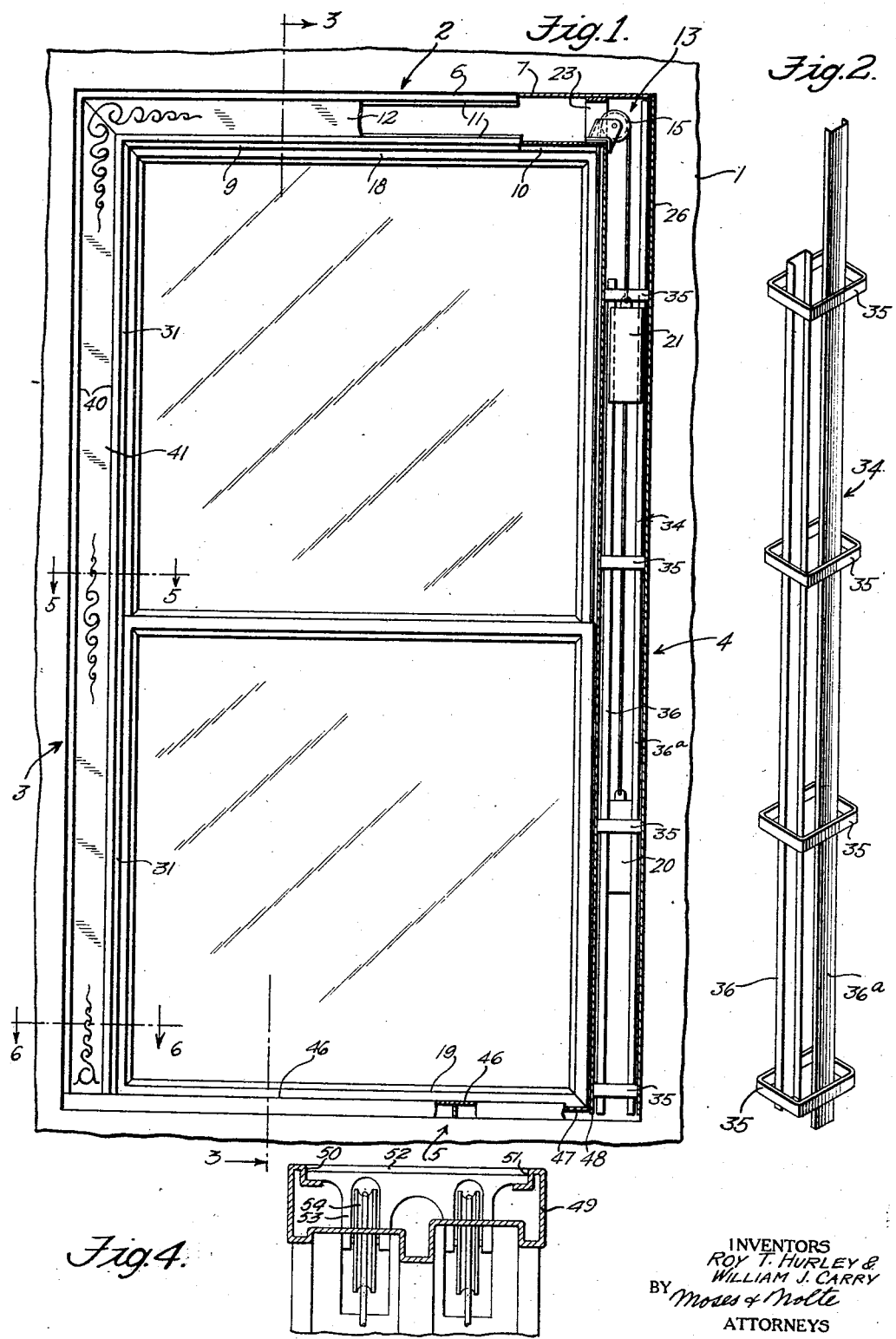

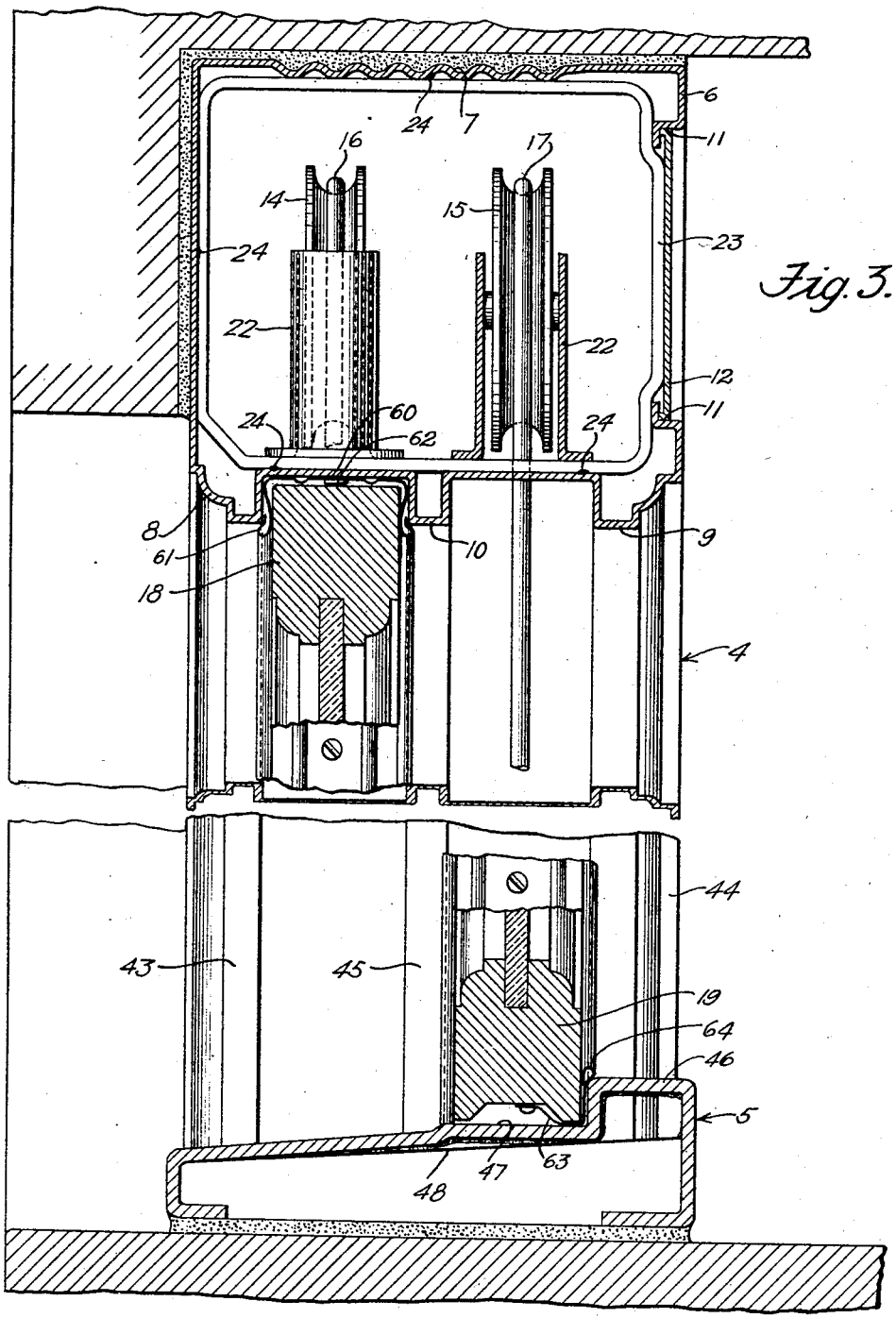

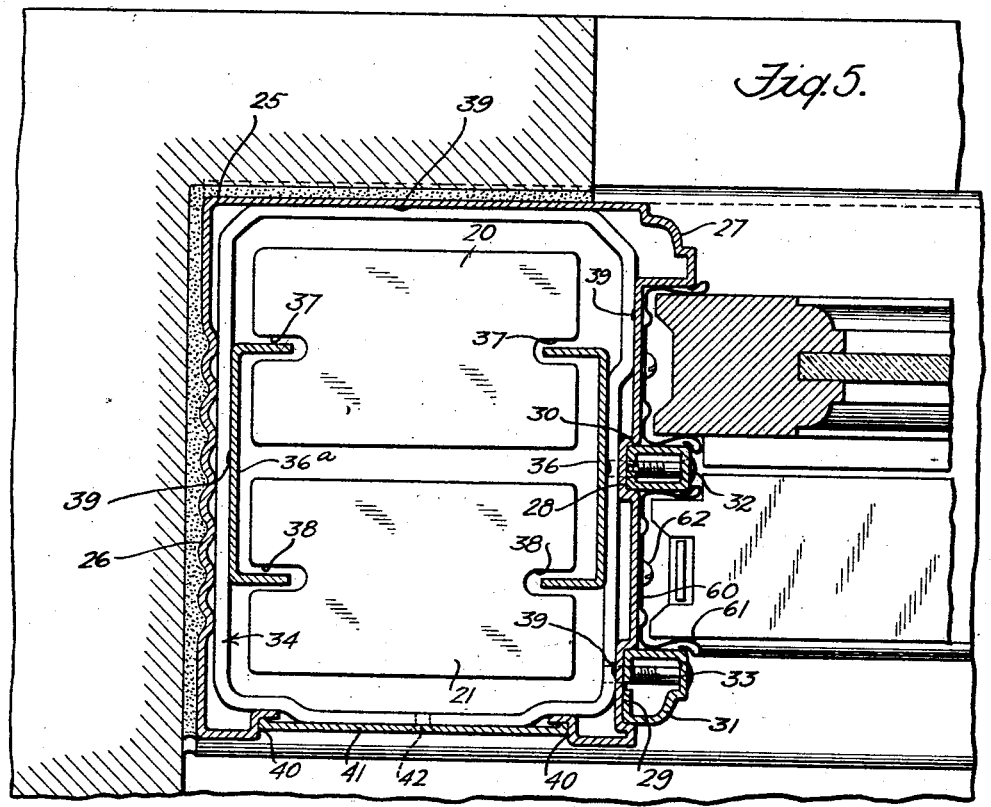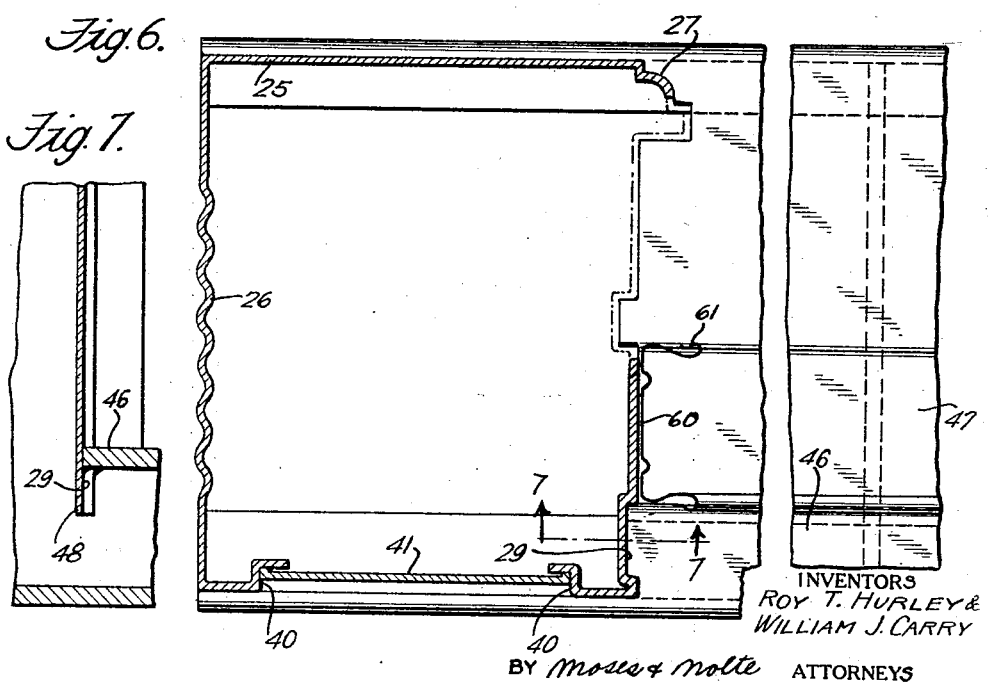

1,808,413

UNITED STATES PATENT OFFICE

ROY T. HURLEY, OF DOBBS FERRY, AND WILLIAM J. CARRY, OF BROOKLYN, NEW YORK, ASSIGNORS TO GENERAL BRONZE CORPORATION, OF LONG ISLAND CITY, NEW YORK, A CORPORATION OF NEW YORK

WINDOW FRAME

Application filed December 8, 1930. Serial No. 500,908.

This invention relates to window frames, and has for an object to provide a metallic window frame structure which will be inexpensive, light, strong, durable and attractive in appearance.

To these ends it is a feature of the invention that the window frame is made for the most part of sheet metal, preferably aluminum, an aluminum alloy, or other non-corroding metal formed in suitable shapes, with the various parts such as the head, jambs and sill being welded to one another.

It is a feature of the invention that provision is made of light but rigid reinforcing frames in skeleton form adapted to be inserted in the jambs and rigidly secured to the jambs at various points, as by welding, to impart to light gage jamb members the desired degree of rigidity.

In accordance with a preferred way of practicing the invention, the reinforcing frames are also utilized as sash weight guide frames, the weight guides taking the form of channel bars. The weight guide frames for each side of the window are assembled with suitable connecting members into a unitary guide frame, which frame is insertable as a unit into one of the hollow jambs and welded thereto.

It is a further feature of the invention that the weight pulley housings are also assembled or made unitary and are inserted as a unit into the head.

Other features of the invention relate to the method of manufacturing and uniting the several parts. A salient feature resides in the method of welding the jambs to the sill and to the head.

In accordance with a preferred form of the invention, the sill and head are provided with openings adapted to receive the ends of the jambs and the ends of the jambs are inserted through these openings to project into the sill and jamb. The parts are then joined by making a continuous weld seam along the angle formed by the outer faces of the inserted member and the inner face of the member which receives it. By following this practice, the weld seams are completely concealed within the head and sill so that no grinding, polishing or other finishing operations are required. The fact that the seams may be left raw or unfinished contributes substantially to the strength of the finished frame, it being unnecessary to remove any metal from the seam or from the area adjacent thereto. The method of welding described is effective, moreover, to avoid exposing any portion of the jamb metal that extends between the sill and the head to the welding temperature or to any temperature high enough to anneal and thereby impair the rigidity of the jamb. This is a very important feature in the securement of a window frame of the desired rigidity with very light gage jamb metal.

The frame of the present invention may be used with sashes of unusual construction. The sashes, however, are preferably constructed in the manner disclosed and claimed in my copending application, Serial No. 500,909 filed December 8, 1930, for window construction. While the frame is illustrated herein as employed in a double hung window, features of the invention may be employed to advantage in windows of other types.

Other objects and advantages will hereinafter appear.

In the drawings forming part of this specification:

Figure 1 is a front elevation, partly broken away, of a window frame embodying features of the invention;

Figure 2 is a perspective view of one of the weight guide frames;

Figure 3 is a sectional elevation broken away intermediate its ends, taken on the line 3—3 of Figure 1, looking in the direction of the arrows;

Figure 4 is a detail view of a structure generally similar to that of the other figures, but incorporating a modified form of head and pulley assembly;

Figure 5 is a fragmentary, horizontal, sectional view, taken on the line 5—5 of Figure 1, looking in the direction of the arrows;

Figure 6 is a fragmentary, horizontal, sectional view, taken on the line 6—6 of Figure 1, looking in the direction of the arrows; and Figure 7 is a fragmentary, vertical, sectional view taken on the line 7—7 of Figure 6, looking in the direction of the arrows.

The window frame is illustrated as set in a wall 1, and comprises a head 2, jambs 3 and 4, and a sill 5. Each of these members is made of sheet metal, preferably an aluminum alloy formed from the flat sheet to proper shape, the sill 5 being desirably of heavier gage metal than the other parts. An aluminum alloy containing five to twelve per cent silicon is the present most preferred material, since this alloy combines the desired properties of lightness, strength, rigidity and freedom from corrosion, and has the further pronounced advantage for welding purposes of being highly fluid when fused and being less subject to corrosion and oxidation at welding than other aluminum alloys or unalloyed aluminum. In the event that a bronze window is desired, it is preferred to use a silicon manganese bronze, as this alloy is strong and well suited for welding.

The head 2 is formed of a sheet 6 shaped to form a partial enclosure, as best seen in Fig. 3. This sheet metal member may have one or more of its concealed walls corrugated, as seen at 7, to interfit with plaster or cement placed in the window opening of the masonry of the wall 1. The lower face of the sheet metal member 6 is formed with projections or ribs, as shown, to provide an outside retaining strip 8, an inside retaining strip 9, and a dividing strip 10. The marginal portions of the member 6 are not brought together, but are rolled to provide rabbets 11 at the inner side, spaced from one another by nearly the full height of the head and adapted to have an ornamental panel 12 snapped, wedged, or otherwise secured into place between them to complete the enclosure.

Provision is made at each end of the head of a pulley assembly 13, comprising pulleys 14 and 15 on which run flexible members, for instance chains, 16 and 17 connected respectively with the upper and lower sashes 18 and 19 and with weights 20 and 21 that run up and down within the hollow jambs 3 and 4. The pulleys are rotatably supported in bearing brackets 22 which are welded to a ring frame 23. The ring frame is assembled with the bearing brackets and the pulleys and then the entire assembly is inserted as a unit into the head and welded to the head at a plurality of points, as indicated at 24.

The head member 6 is mitered at the opposite ends thereof and is united by welding with mitered upper ends of the jambs 3 and 4.

The jamb 3 consists of a sheet metal member 25 rolled to a suitable shape, as that shown in Fig. 5, so that it defines a figure generally rectangular in cross section enclosed at three sides but open at the fourth or inner side, that is, the side facing the interior of the room. One or more of the concealed walls of the jamb 3 may be corrugated, as shown at 26, to interfit with plaster or cement placed in the window opening of the masonry of the wall 1. The sash guiding wall of the jamb is provided with an outwardly projecting rib portion forming an outside retaining strip 27 and with external recessed portions 28 and 29 for receiving a sheet metal parting strip member 30 and a sheet metal inside retaining strip member 31. Each of the members 30 and 31 is formed from sheet aluminum or other suitable metal to the shape shown and welded along a seam which is located at a concealed portion of the strip. Each strip is removably held in place, the strip 30 being held to the jamb 3 by screws 32, and the strip 31 being held to the jamb 3 by screws 33.

The jamb 3 receives a weight guide frame 34 which is best illustrated in Fig. 2. This frame consists of a series of ring frames 35 having a pair of channel bars 36, 36a welded to them. The channel bars 36, 36a are preferably rolled sheet metal members, and they are so mounted in the ring frames that the flanges thereof are arranged in directly opposed pairs. As best seen in Fig. 5, the weights 20 and 21 have grooves 37 and 38 formed in opposite faces thereof so that each weight interfits with, and is guided by, an opposed pair of channel bar flanges. The channel bars 36, 36a and the ring frames of the weight guide frame are assembled preferably by welding and are then inserted in the jamb as a unit, being welded to the jamb at various points, as indicated at 39. It will be noted that the channel bar 36 is substantially shorter than the channel bar 36a, the arrangement being such that the weights may be introduced into place or removed after the channel bars are in place, at a point above the upper end of channel bar 36.

Because of their channel form the bars 36 and 36a are quite rigid and therefore serve to reinforce and to contribute substantially to the rigidity of the light gage jamb members when secured to the jamb members at various points.

The sheet metal member 26 of the jamb 3 is, like the head member, provided with opposed rabbets 40 adapted to receive an ornamental face panel 41. This face panel may be snapped into place or it may be additionally held by screws 42 threaded into the ring frames of the weight guide frame. Removal of the panels 41 gives access to the interior of the jamb for permitting necessary repairs or readjustments of the weights and weight chains.

The removable face panels 41 together with the removable head panel 12, in the event that such a removable panel is provided, make possible the ready adaptation of the window to various types of ornamentation, as may be desirable to harmonize with the decorative scheme of the apartment. By merely removing the panels and substituting others of a different form of decoration, which may be of either metallic or non-metallic finish, any desired appearance or ornamental effect may be readily secured.

The jamb 4 is generally similar to the jamb 3, but differs in that the jamb 4 is provided on its sash guiding face with integral projections or ribs forming inside and outside retaining strips 43 and 44 and parting strips 45. These strips may be made integral, since it is only necessary to provide for removal of the inside and parting strips at one side of the window in order to permit the sashes to be removed. The jamb 4, like the jamb 3, is provided with a sash weight guide assembly.

The sill 5 consists of a sheet metal member rolled to the cross sectional form illustrated in Fig. 3. The upper surface of the sill is shaped to form a projection or rib forming an inside retaining body 46 and a seat 47 for the lower sash 19. The sill is cut at its opposite ends to provide holes that receive and fit the jambs 3 and 4. The jambs at their lower ends are preferably cut on a bevel as shown in Fig. 3 and are made of sufficient length to assure that a margin 48 of the jamb metal will be exposed within the sill all the way around the opening. The jamb is welded continuously to the sill, the weld being caused to extend along the angle formed by the jamb and sill metal at the inside of the sill (Fig. 7). This method of welding the jambs to the sill constitutes an important feature of the invention, it being a point that the relatively heavy sill metal protects that portion of the jamb metal which will be visible in the finished window against possible burning.

Any suitable means may be provided for rendering the windows weather proof. In the construction illustrated the sash grooves in the jambs and head are provided with weathering strips in the form of channels 60 made from sheet metal of suitable character, preferably zinc. These channels may be removably secured in the grooves in any suitable manner, as by screws 62. At their edges the channel flanges are curved back upon themselves to provide spring lips 61 which bear against the retaining and parting strips, thereby pressing the channel flanges against the faces of the sashes with sufficient yielding pressure to make the window weather proof and prevent rattling, while at the same time not interfering with the free sliding movement of the sashes. At the sill a weather tight joint may be made by attaching a weather strip 63 to the bottom of the sash, such weather strip having a surface adapted to engage the rib on the sill, a yielding pressure being provided by bending over the edge of the strip at 64 into a spring lip bearing against the edge of the sash.

In Figure 4 disclosure is made of a modified form of head, the construction of the head in this form of the invention being quite similar to the sill construction just described. The head 49 is formed of a sheet of metal rolled to the shape illustrated in Fig. 4, and the ends of this head are cut to provide holes in which the jambs fit, (the jambs in this instance not being mitered). The jambs are welded to the head in the same manner that the jambs are welded to the sill in the form of the invention illustrated in Figs. 1 to 3 and 5 to 7. It will be noted that the head 49 is open at the top thereof and is formed to provide opposed rabbets 50 and 51. Die-cast pulley frames each consisting of a base 52 and bearing members 53 integral therewith and having pulleys 54 mounted in them are placed with the ends of the base lying in the rabbets 50 and 51 and the pulleys suspended from the base. The base 52 is then welded to the head along the edges of the base.

With this form of construction every weld may be made from the concealed side of the frame so that no welding seams are formed at any stage of the manufacture of the frame which required subsequent grinding or polishing.

A window frame constructed as described herein has pronounced advantages over window frames of the prior art in lightness, cheapness of manufacture, attractiveness of appearance, and in the fact that the frame, being formed of non-corroding metal, need not be painted, and in any event will not corrode if repainting is neglected.

In manufacturing the head, sill, and jamb pieces the sheet metal stock is rolled to appropriate shape in lengths sufficient to form the required part for a plurality of window frames and these lengths are subsequently cut, as orders are received, to proper size for making window frames of the dimensions ordered. The same practice is followed with reference to the removable panels and the weight guide assemblies.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be utilized.

What is claimed is:

1. In a window frame, in combination, a hollow sheet metal jamb and a weight guide frame insertable as a unit in the jamb and welded thereto.

2. In a window frame, in combination, a hollow sheet metal jamb having an opening in the front thereof, a removable ornamental panel covering said opening, weight guiding means within the jamb, and weights running in the guiding means, said guiding means being formed to permit removal of the weights through the jamb opening.

3. In a window frame, in combination, a hollow sheet metal jamb having an opening in the front thereof, a removable panel covering said opening, and a weight guide assembly comprising frame members secured to the jamb and facing flanged bars secured to the frame members to form conjointly a pair of weight guides, one of the bars terminating a substantial distance below the top of the jamb to permit removal or introduction of the weights, as desired.

4. In a window frame, in combination, a jamb and a weight guide assembly therein, comprising frame members, facing flanged bars secured to the frame members to form conjointly a pair of weight guides, one of the bars being substantially shorter than the other to facilitate introduction of the weights into the guides and removal of the weights therefrom.

5. In a window frame, in combination, a hollow channel-shaped, sheet metal head member open at one side and a unitary weight pulley assembly spanning the opening and fixedly secured to the head member at opposite sides of said opening for reinforcing the head member.

6. In a window frame, in combination, a sheet metal jamb and a skeleton reinforcing frame positioned within the jamb and fixed to the jamb at a plurality of longitudinally spaced points.

7. In a window frame, in combination, a sheet metal jamb and a skeleton reinforcing frame positioned within the jamb and fixed to the jamb at a plurality of longitudinally spaced points, said reinforcing frame including a longitudinally extending flanged bar.

8. In a window frame, in combination, a sheet metal jamb and a skeleton reinforcing frame positioned within the jamb and fixed to the jamb at a plurality of longitudinally spaced points, said reinforcing frame including a plurality of facing channel bars.

9. A metal window frame comprising a pair of hollow sheet metal horizontal members and a pair of hollow sheet metal jambs disposed between said horizontal members, one of said horizontal members being formed of relatively heavy sheet metal, and the jambs being formed of relatively light sheet metal and fitted through openings in said one of the horizontal members, and weld seams uniting said last named horizontal member and the jambs in the angles formed by the inner face of the horizontal member and the outer faces of the jambs, the arrangement being such that a rigid and permanent union is formed between the said horizontal member and the jambs without injuring the exposed portion of the jamb.

10. A window frame comprising a sill and a jamb, the sill being formed of sheet metal, and the jamb being formed of lighter gauge sheet metal and being fitted through an opening in the sill, and a weld seam uniting the sill and jamb in the angle formed by the inner face of the sill, and the outer faces of the jamb, the arrangement being such that a rigid and permanent union is formed between the sill and the jamb without injuring the exposed portion of the jamb.

11. A window frame comprising a head and a jamb, the head being formed of sheet metal and the jamb being formed of lighter gauge sheet metal and being fitted through an opening in the head, and a weld seam uniting the jamb and head in the angle formed by the inner face of the head and the outer faces of the jamb, the arrangement being such that a rigid and permanent union is formed between the jamb and the head without injuring the exposed portion of the jamb.

12. In a window frame, in combination, a hollow sheet metal head member having a longitudinal opening in the top thereof, and a pulley unit having a base portion arranged in spanning relation to said opening and welded to the head member at opposite sides of the opening, said unit thereby serving as a reinforcement for said head member.

In testimony whereof we have affixed our signatures to this specification.

ROY T. HURLEY.
WILLIAM J. CARRY.